United States Patent [19]
Taguchi et al.

[11] Patent Number: 5,868,419
[45] Date of Patent: Feb. 9, 1999

[54] AIR BAG DOOR STRUCTURE OF INSTRUMENT PANEL

[75] Inventors: Hiroki Taguchi; Kentaro Iwanaga; Hiroaki Suzuki, all of Aichi, Japan

[73] Assignee: Inoac Corporation, Aichi, Japan

[21] Appl. No.: 659,237

[22] Filed: Jun. 5, 1996

[30] Foreign Application Priority Data

Jun. 5, 1995 [JP] Japan ..................................... 7-162877
Apr. 26, 1996 [JP] Japan ..................................... 8-130743

[51] Int. Cl.⁶ .................................................... B60R 21/20
[52] U.S. Cl. ......................................... 280/728.3; 280/732
[58] Field of Search ............................... 280/728.3, 732, 280/730.1, 728.2, 728.1, 752

[56] References Cited

U.S. PATENT DOCUMENTS

| | | | |
|---|---|---|---|
| 5,158,322 | 10/1992 | Sun | 280/732 |
| 5,375,876 | 12/1994 | Bauer et al. | 280/728.3 |
| 5,456,487 | 10/1995 | Daris et al. | 280/728.3 |
| 5,564,731 | 10/1996 | Gallagher et asl. | 280/728.3 |
| 5,590,903 | 1/1997 | Phillion et al. | 280/728.3 |

FOREIGN PATENT DOCUMENTS

| | | | |
|---|---|---|---|
| 4-185551 | 7/1992 | Japan | 280/728.3 |
| 2265338 | 9/1993 | United Kingdom | 280/728.3 |

*Primary Examiner*—Peter C. English
*Attorney, Agent, or Firm*—Sughrue, Mion, Zinn, Macpeak & Seas, PLLC

[57] ABSTRACT

An air bag door structure is integrally backed with a door reinforcement member in the rear of an air bag door opening portion of an instrument panel. A hinge side break portion of is provided at the door rotation axis side of the instrument panel, and a hinge side mount portion for mounting an air bag container is formed at a hinge portion of the door reinforcement member. An instrument panel mount portion for mounting the air bag container is integrally formed along the outside of an opening side break portion of the instrument panel. Accordingly, stress forces created by the deployment of the air bag are concentrated at the break portions.

13 Claims, 12 Drawing Sheets

AIR BAG DOOR STRUCTURE OF INSTRUMENT PANEL

BACKGROUND OF THE INVENTION

1. Field of the Invention

The present invention relates to an air bag door structure in an instrument panel of a car and particularly relates to an air bag door structure integrally backed with a door reinforcement member in the rear side of an air bag door opening portion of an instrument panel.

2. Description of the Related Art

Figure 17:
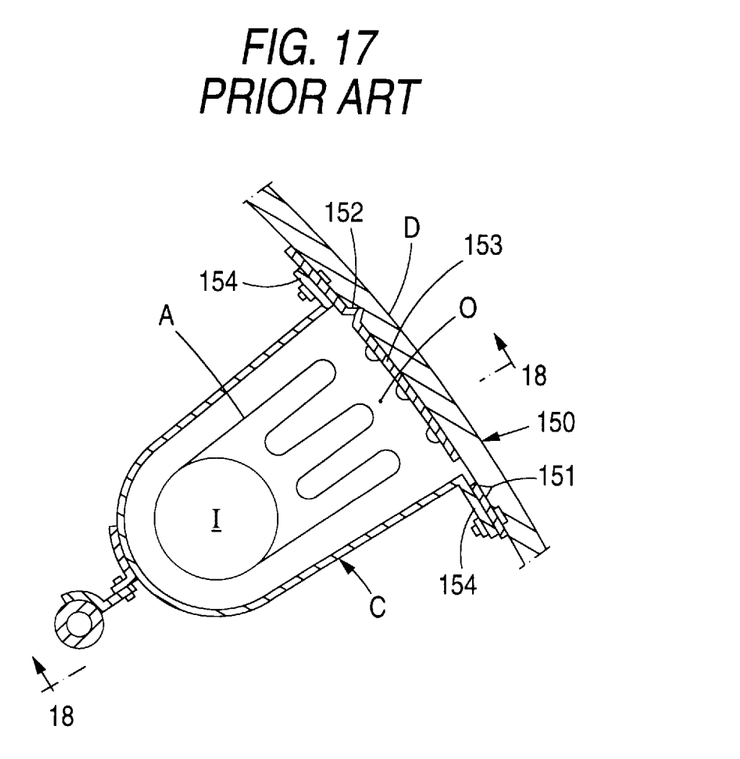
FIG. 17 is a cross-sectional view showing an air bag door portion in a conventional structure.
Figure 18:
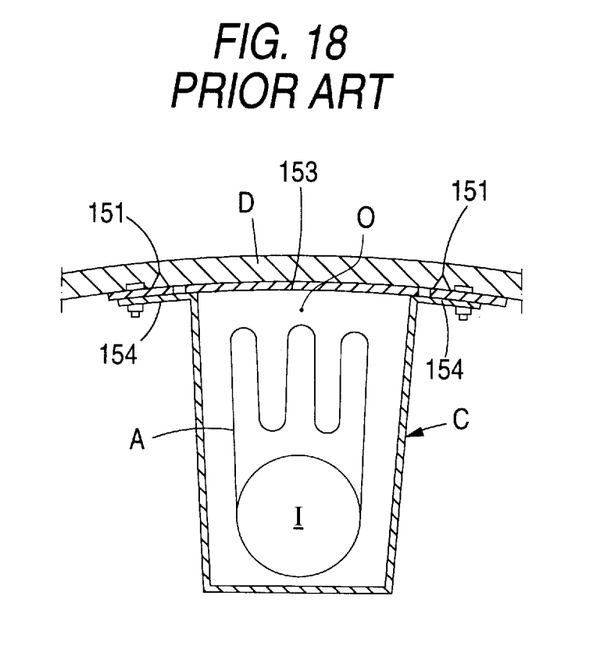
FIG. 18 is a cross-sectional view taken along the line 18—18 in FIG. 17.

As shown in FIGS. 17 and 18, an air bag device provided in the front passenger side of a car is designed so that a folded air bag A contained together with an air bag actuating member (inflator) I in an air bag container C is stored in the inside of an instrument panel 150 in front of the front passenger's seat. The upper portion of the air bag container C is formed as an opening portion O for expanding the air bag A into the car room. A mount portion 154 to the instrument panel 150 is provided in the outer circumference of the opening portion O.

The air bag container C is fixed to the rear surface of the instrument panel 150 through the mount portion 154. The opening portion O is covered by an air bag door portion D formed integrally with the instrument panel 150.

A break portion 151 made from fragile portions such as V-grooves, slits, or the like, is formed in the instrument panel 150 so as to be substantially U-shaped or square-shaped so that the air bag door portion D of the instrument panel 150 is defined by this break portion. The air bag door portion D is integrally backed with a door reinforcement member 153 such as an aluminum plate, an iron plate, or the like, having a hinge portion 152 in the rear side of the air bag door portion D partitioned by the break portion 151.

In the air bag device configured as described above, the inflator I is operated so that the air bag A expands instantaneously when the car is subjected to large impact. As a result, the air bag door portion D is forced open from the inside, so that the break portion 151 is cleaved. As a result, the air bag door portion D is opened through the hinge portion 152. The air bag A is expanded into the car room through the opening portion O.

In this structure, the air bag door portion D is formed integrally with the instrument panel 150. Accordingly, there arises an advantage in that the external appearance is cleaner compared with an air bag door portion molded and mounted separately.

Figure 19:
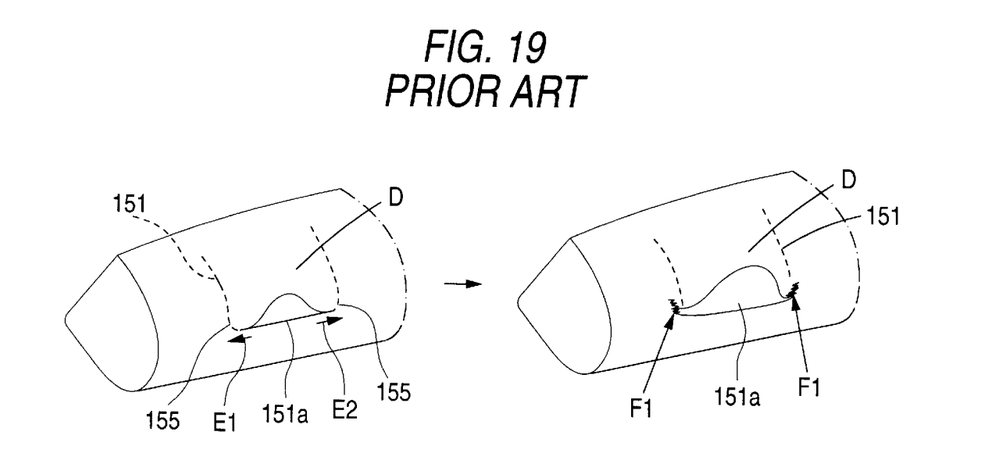
FIG. 19 is a schematic view showing an example of the opening state of the air bag door portion in the conventional structure.
Figure 20:
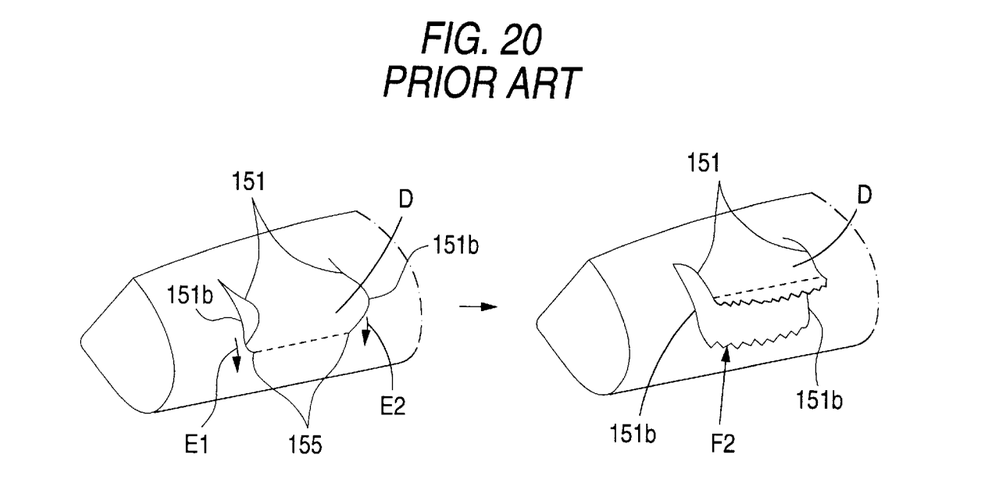
FIG. 20 is a schematic view showing another example of the opening state of the air bag door portion in the conventional structure.

However, when, for example, the break portion 151 is substantially U-shaped as shown in FIGS. 19 and 20, transmission between traverse (left and right) cleavage 151a and longitudinal (front and rear) cleavage 151b is not smooth because of corner portions 155, or the like, of the break portion 151 at the time of cleavage. As a result, the cleavage gnaws into the instrument panel in the directions E1 and E2 so that the expansion of the air bag door portion D is resisted by the gnawed portions F1 and F2.

Particularly, since the area around the hinge portion side of the air bag door portion D is reinforced by the door reinforcement member 153 and the instrument panel in the outer circumference of the break portion 151 in the door opening portion side is not reinforced, the cleavage occurs more easily in portions other than the break portion 151.

Figure 21:
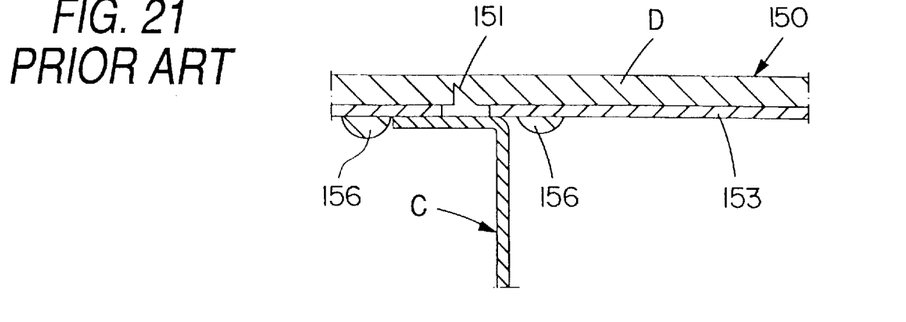
FIG. 21 is a cross-sectional view showing an example of the break portion in the conventional structure.
Figure 22:
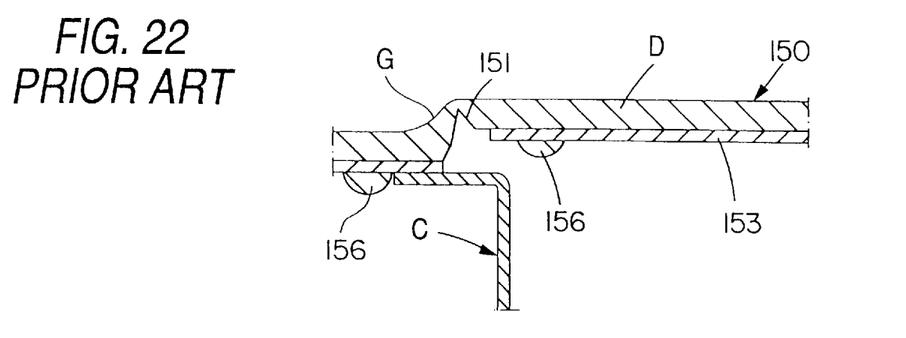
FIG. 22 is a cross-sectional view showing a state in which pressure is applied to the door portion in the example of FIG. 21.
Figure 23:
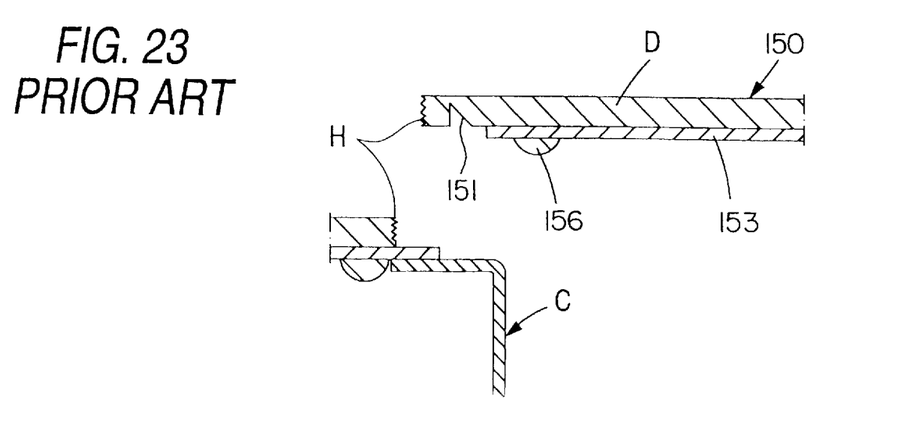
FIG. 23 is a cross-sectional view showing a state in which the door portion in the example of FIG. 21 is opened.

Furthermore, as shown in FIG. 21, the air bag door portion D is backed with the door reinforcement member 153, but it is generally the case that the reinforcement member 153 is integrally fixed to the rear of the instrument panel 150 by providing bosses 156 in the rear of the air bag door portion D of the instrument panel 150 and by thermally caulking the bosses 156 through the reinforcement member 153. Therefore, it is preferable that the bosses 156 and the break portion 151 are provided so as to be as far from each other as possible to prevent the fragile break portion 151 from being affected by heat. As a result, however, the break portion 151 is pulled by the bosses 156 when the air bag door portion D is opened. Thus, there is a risk that bending G as shown in FIG. 22 may occur in the air bag door portion and that the air bag door portion may be cleaved in portions other than the break portion 151 as represented by the reference character H in FIG. 23.

SUMMARY OF THE INVENTION

The present invention has been made to solve the aforementioned problems, and, therefore, an object of the present invention is to provide an air bag door structure of an instrument panel in which the external appearance is good and in which the break portion of the air bag door portion can be properly cleaved without cleaving portions of the air bag door in areas other than the break portion when the air bag is expanded.

In order to achieve the foregoing object, there is first proposed an air bag door structure integrally backed with a door reinforcement member on a rear side of an air bag door opening portion of an instrument panel, comprising: a hinge side break portion provided in the door rotation axis side of the air bag door, an opening side break portion provided in the door opening side of the air bag door, and an instrument panel mount portion for an air bag container unitedly formed along the outside of said opening side break portion. Also a hinge portion serving as a door rotation axis and a hinge side mount portion for attachment to said air bag container are formed in said reinforcement member along the inside of said hinge side break portion of said instrument panel.

Further, as means for achieving the same object, there is secondly proposed an air bag door structure integrally back with a door reinforcement member on a rear side of an air bag door opening portion of an instrument panel, comprising: a hinge side break portion provided at least in a door rotation axis side in an air bag door opening portion of said instrument panel, a body portion of said door reinforcement member integrated with said instrument panel, a hinge portion serving as the door rotation axis and a hinge side mount portion for attachment to an air bag container formed in said body portion along the inside of said hinge side break portion of said instrument panel, and an opening side break portion and a reinforcement member mount portion for attachment to said air bag container along the outside of said opening side break portion formed in the door opening portion side of said air bag door opening portion.

BRIEF DESCRIPTION OF THE DRAWINGS

The above and other objects and features of the present invention will be more apparent from the following description take in conjunction with the following accompanying drawings.

DETAILED DESCRIPTION OF THE PREFERRED EMBODIMENTS

Now, a description will be given in more detail of embodiments of the present invention with reference to the accompanying drawings.

The structure according to one embodiment of the present invention will be described.

Figure 1:
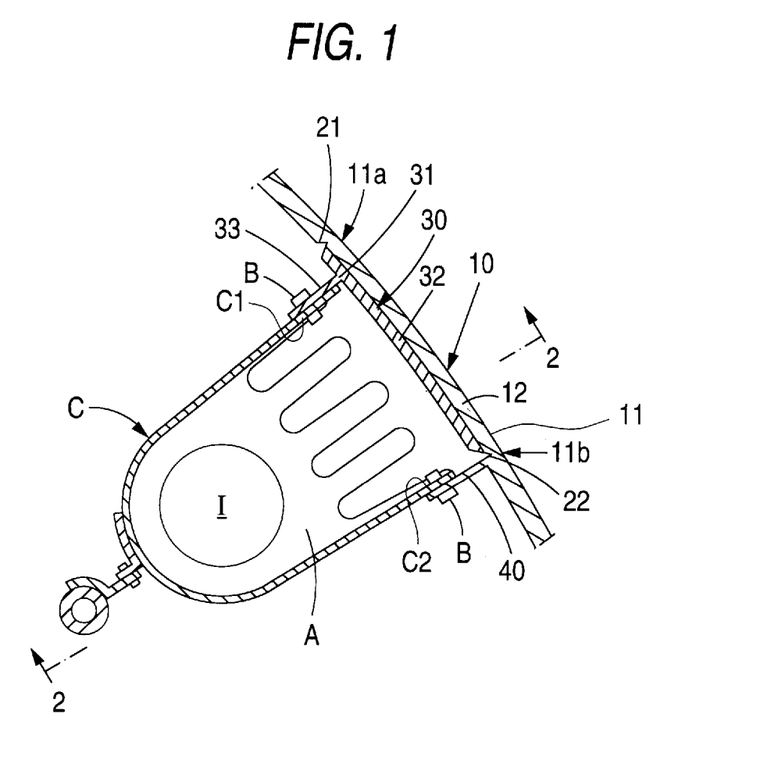
FIG. 1 is a cross-sectional view showing an air bag door portion of an instrument panel according to one embodiment of the present invention.
Figure 2:
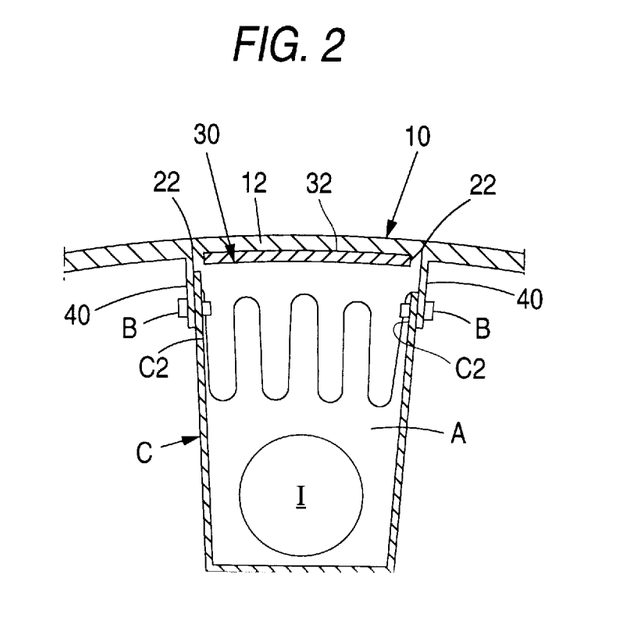
FIG. 2 is a sectional view taken along the line 2—2 in FIG. 1.
Figure 3:
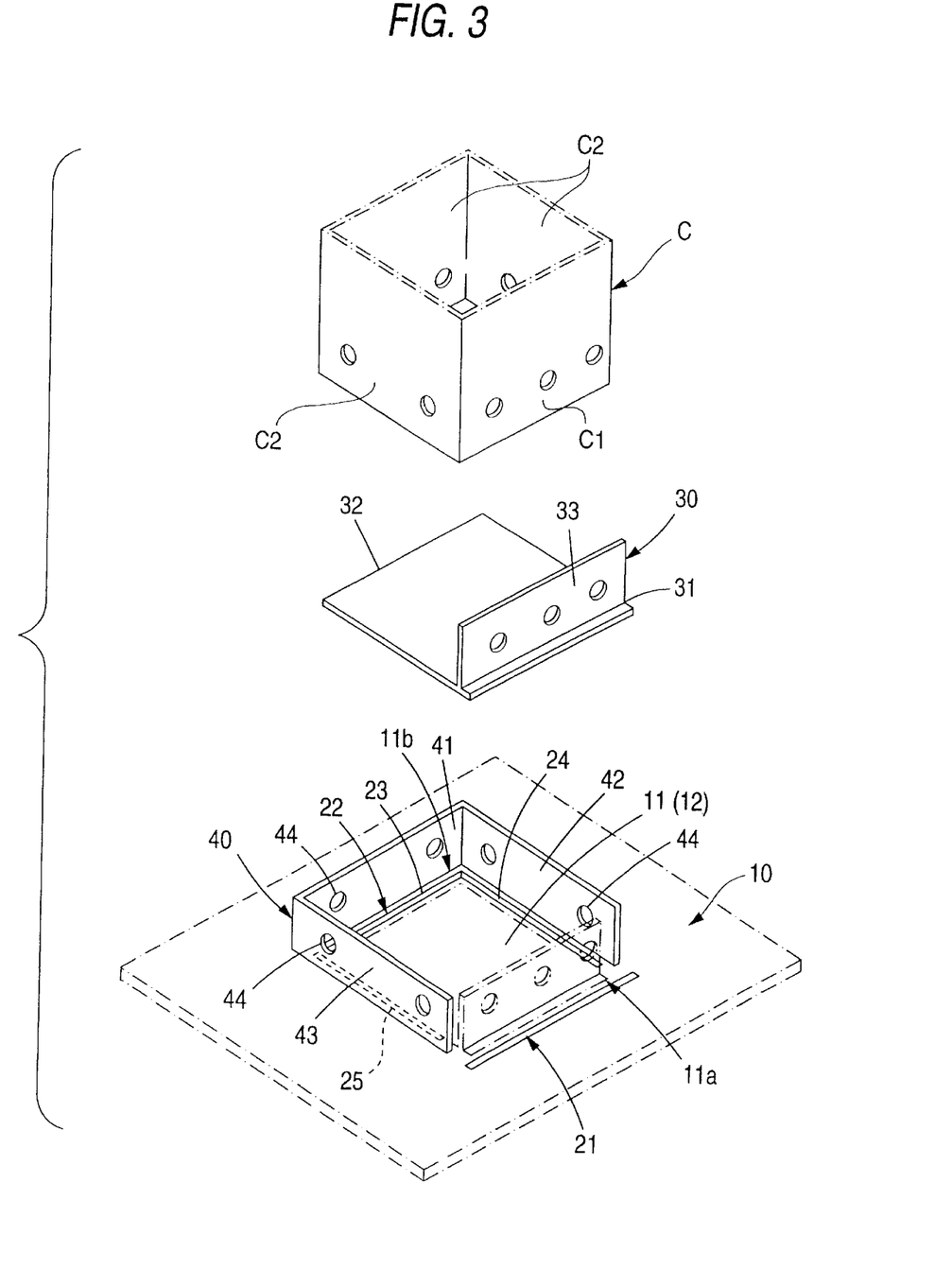
FIG. 3 is an exploded perspective view showing the structure of FIG. 1 viewed from the rear of the instrument panel.

It is to be understood from the sectional views of FIGS. 1 and 2 and the exploded perspective view of FIG. 3 that a hinge side break portion (line) 21 and an opening side break portion (line) 22 are provided in the door rotation axis side 11a and in the door opening portion 11 of an instrument panel 10. The hinge side break portion 21 and opening side break portion 22 are formed from by fragile portions such as V-grooves, U-grooves, slits, or the like, provided in the rear side of the instrument panel 10 and define the shape of a door portion 12 as shown in the drawing. These break portions 21 and 22 are broken by pressure of an air bag at the time of the expansion of the air bag so that the door portion 12 is rotatably opened to the passenger compartment side with the rotation axis side 11a as its center.

Figure 5:
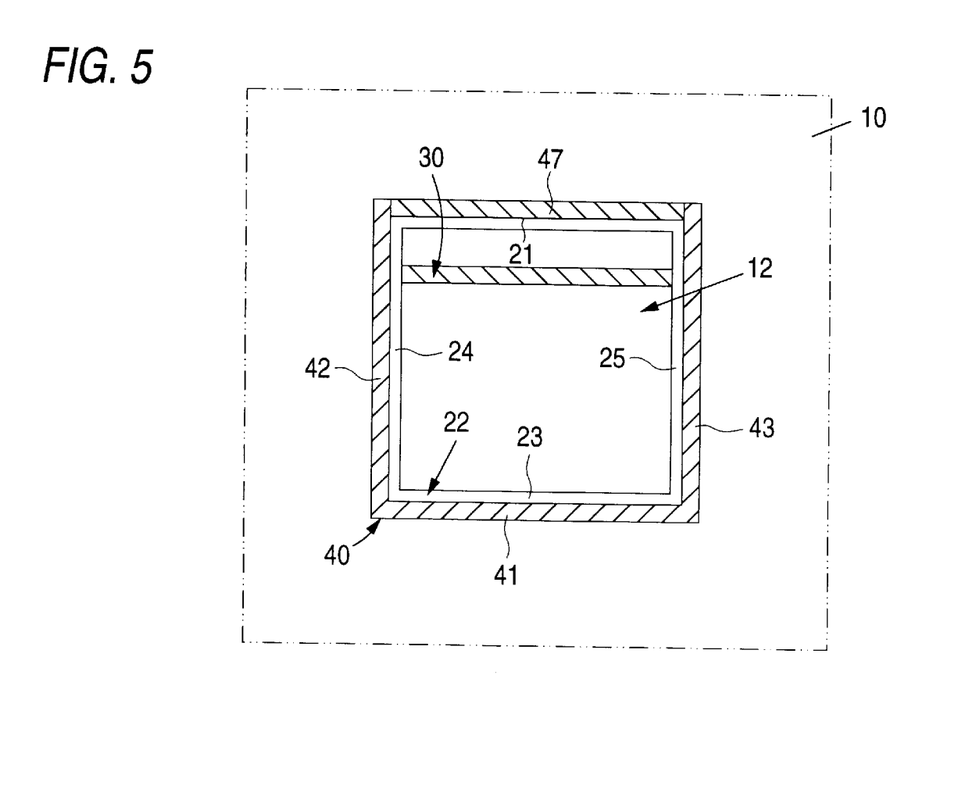
FIG. 5 is a cross-sectional view showing the rear of the instrument panel according to a modified embodiment of the present invention.

Although this embodiment has shown the case where these break portions are comprised of an independent hinge side break portion 21 and a substantially U-shaped opening side break portion 22 formed by continuing three break lines 23, 24 and 25 as shown in FIG. 3, the hinge side break portion 21 and the opening side break portion 22 may be continued so as to be substantially square-shaped (see FIG. 5).

Further, in the rear of the instrument panel 10, an instrument panel mount portion 40 for an air bag container C is integrally formed on the outside of the opening side break portion 22 so as to be arranged along the break portion 22. The reference numeral 44 designates mount holes.

In this embodiment, as shown in FIG. 3, the mount portion 40 is designed so that three flange-like projection pieces 41, 42 and 43 are provided on the outside of the opening side break lines 23, 24 and 25 so as to be arranged along the opening side break lines 23, 24 and 25 so as to be substantially U-shaped. These projection pieces 41, 42, 43 provide structure for mounting to mount portions C2 and the air bag container.

A door reinforcement member 30 is provided in the rear of the door portion 12 in the instrument panel 10.

In this embodiment, the door reinforcement member 30 is formed form a metal plate or a plastic molding substantially L-shaped in section as shown in the drawing and is composed of a hinge portion 31, a body portion 32, and a mount portion 33 for mounting to the air bag container C.

Though not shown, this door reinforcement member may be formed from a flexible net member including a reinforcement portion which is integrally buried in the rear of the instrument panel.

The hinge portion 31 which serves as the rotation center axis portion of the door portion 12 at the time of the opening of the door portion 12 is arranged on the inside of the door portion at the hinge side break portion 21 of the instrument panel 10 so as to be parallel with the hinge side break portion 21.

Furthermore, a body portion 32 is integrally formed on the inside of the rear of the door portion 12 defined by the hinge side break portion 21 and the opening side break portion 22 to thereby back and reinforce the door portion 12. Incidentally, as will be described later, this air bag door reinforcement member 30 is preferably provided so as to be in contact with the hinge side break portion 21 and the opening side break portion 22 of the instrument panel 10.

Further, the mount portion 33 is integrally extended from the hinge portion 31, so that the door reinforcement member 30 is mounted to a mount portion C1 of the air bag container C by bolts B, or the like, as shown in FIG. 1.

This door reinforcement member 30 is arranged as an insert at the time of the molding of the instrument panel so that the door reinforcement member 30 can be formed integrally with the molding of the instrument panel. Further, in the case where the door reinforcement member 30 is formed from a plastic molding, the door reinforcement member and the instrument panel can be formed simultaneously and integrally by a known double injection method.

Incidentally, in this embodiment, there is shown an example in which the door reinforcement member is formed separately as an insert member in advance.

Next, the relation between the aforementioned break presumptive portion and the mount portion will be described.

Figure 4:
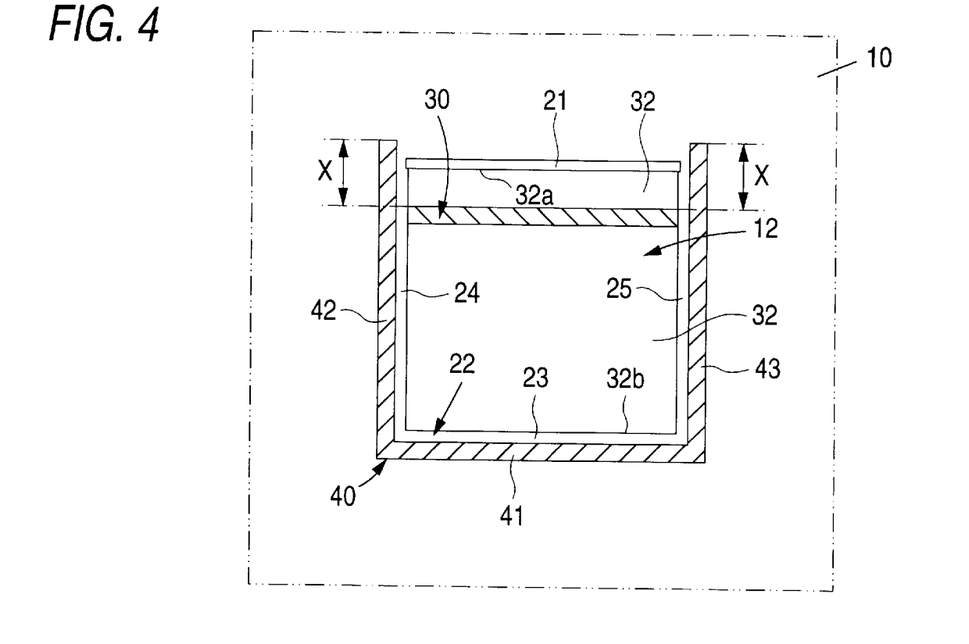
FIG. 4 is a cross-sectional view showing the rear of the instrument panel in the structure of the embodiment.

FIG. 4 is a sectional view, viewed from the rear of the instrument panel 10, of the structure depicted in FIG. 3. It is to be understood from this drawing that the mount portion 40 composed of flange-like projection pieces 41, 42 and 43 formed in the instrument panel 10 is preferably formed so that the opening side break portion 22 (23, 24 and 25) is located in the base portion of the (door portion 12 side) inside of the mount portion 40 in order to ensure proper cleavage of the door portion 12.

For the same reason, the body portion 32 of the door reinforcement member 30 is preferably formed so that the hinge side break portion 21 and the opening side break portion 22 (23, 24 and 25) are located so as to be in contact with the contour lines 32a and 32b, respectively, of the body portion 32.

Further, the mount portion 40 may be formed so as to be 10 longer than the opening side break portion 22 (23, 24 and 25). In FIG. 4, the flange-like projection pieces 42 and 43 constituting the mount portion 40 are formed so as to be longer by length "x" than the corresponding opening side break portions 24 and 25.

Additionally, as shown in FIG. 5, a hinge side mount portion 47 may be formed on the outside of the hinge side break portion 21 in the example of FIG. 4. In this case, the hinge side mount portion 47 is preferably formed so that the flange-like projection pieces 42 and 43 constituting the mount portion 40 are extended integrally as shown in this example. This configuration will provide better cleavage of the door portion 12 in the hinge side break portion 21.

Figure 6:
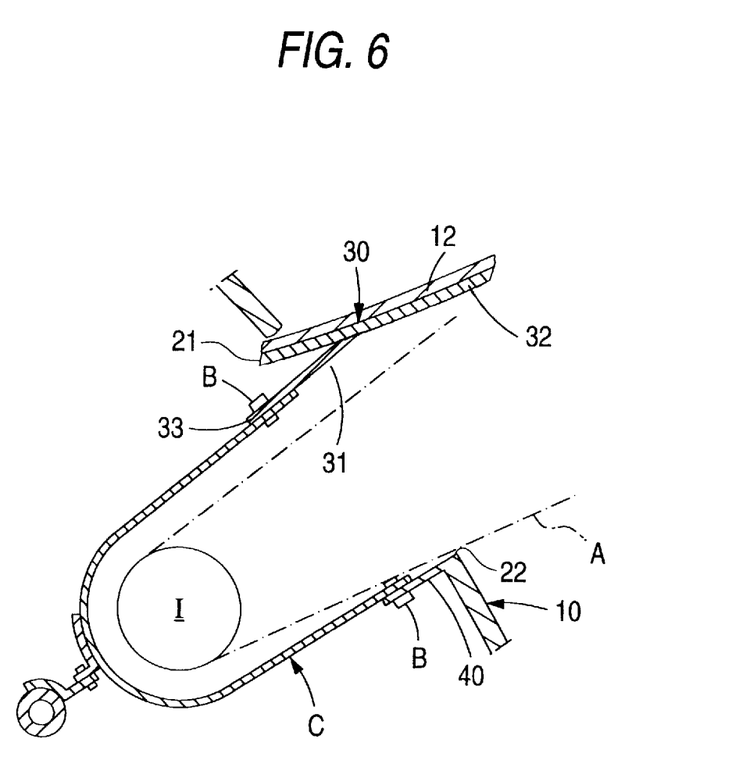
FIG. 6 is a cross-sectional view showing a state in which the air bag door portion is opened.

The door opening state of the structure in this 25 embodiment is shown in FIG. 6. As shown in the drawing, the air bag A expanded by the operation of an air bag operating device I forcibly opens the door portion 12 of the instrument panel 10 so as to expand into the passenger compartment through the upper opening portion of the air bag container C.

In the structure according to the present invention, the door reinforcement member 30 has the hinge portion 31 serving as the center axis of the air bag door portion 12. Furthermore, the body portion 32 is formed integrally with the hinge portion for backing and reinforcing the air bag door of the instrument panel along the hinge side break portion 21. Additionally, the mount portion 33 is integrally formed with the hinge portion 31 for mounting the air bag to the air bag container C and is provided on the inside of the door portion 12 of the hinge side break portion 21 in the instrument panel 10. Consequently, upon expansion of the air bag, the air bag door portion 12 formed in the instrument panel 10 is rotated together with the door reinforcement member 32 around the hinge portion 31 of the reinforcement member 32, thereby providing an opening for the air bag into the passenger compartment.

On the other hand, the mount portion 40 to the air bag container C is integrally formed with the instrument panel 10 on the back side of the door portion 12 along the outside of the opening side break portion 22 of the instrument panel 10. Accordingly, the outside portion of the door portion 12 of the opening side break portion 22 of the instrument panel 10 is connected firmly to the air bag container C.

Hence, in the case where the door portion 12 of the instrument panel 10 subjected to the expansion pressure of the air bag A and is forcibly opened together with the door reinforcement member 30, the hinge portion 31 and the mount portions 33 and 40 to the air bag container C in the instrument panel 10 are connected firmly to the air bag container C, so that stress created by the expansion of the air bag A is effectively concentrated at the hinge side break portion 21 and the opening side break portion 22 which are fragile portions provided near the mount portions 33 and 40. By concentrating the stress, the door portion 12 is broken securely along the hinge side break portion 21 and the opening side break portion 22 with the hinge portion 31 of the door reinforcement member 30 as its center as shown in FIG. 4.

Next, the structure according to a second embodiment will be described with reference to FIGS. 7 through 13.

Figure 7:
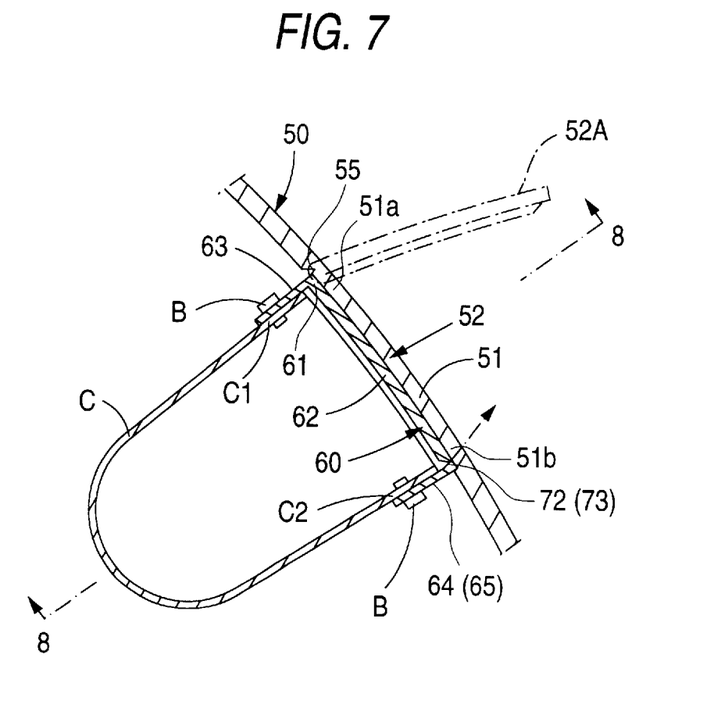
FIG. 7 is a cross-sectional view showing an air bag door portion of an instrument panel according to a second embodiment of the present invention.
Figure 8:
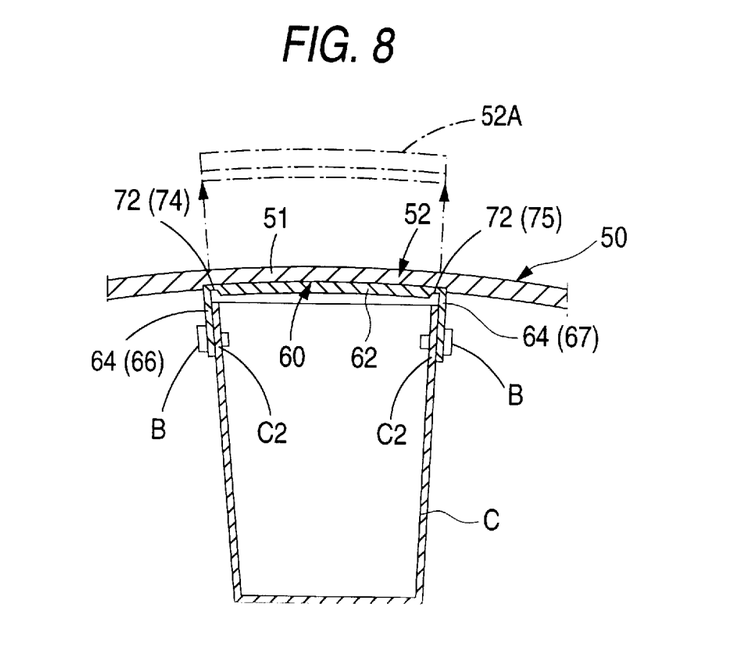
FIG. 8 is a cross-sectional view taken along the line 8—8 in FIG. 7.
Figure 9:
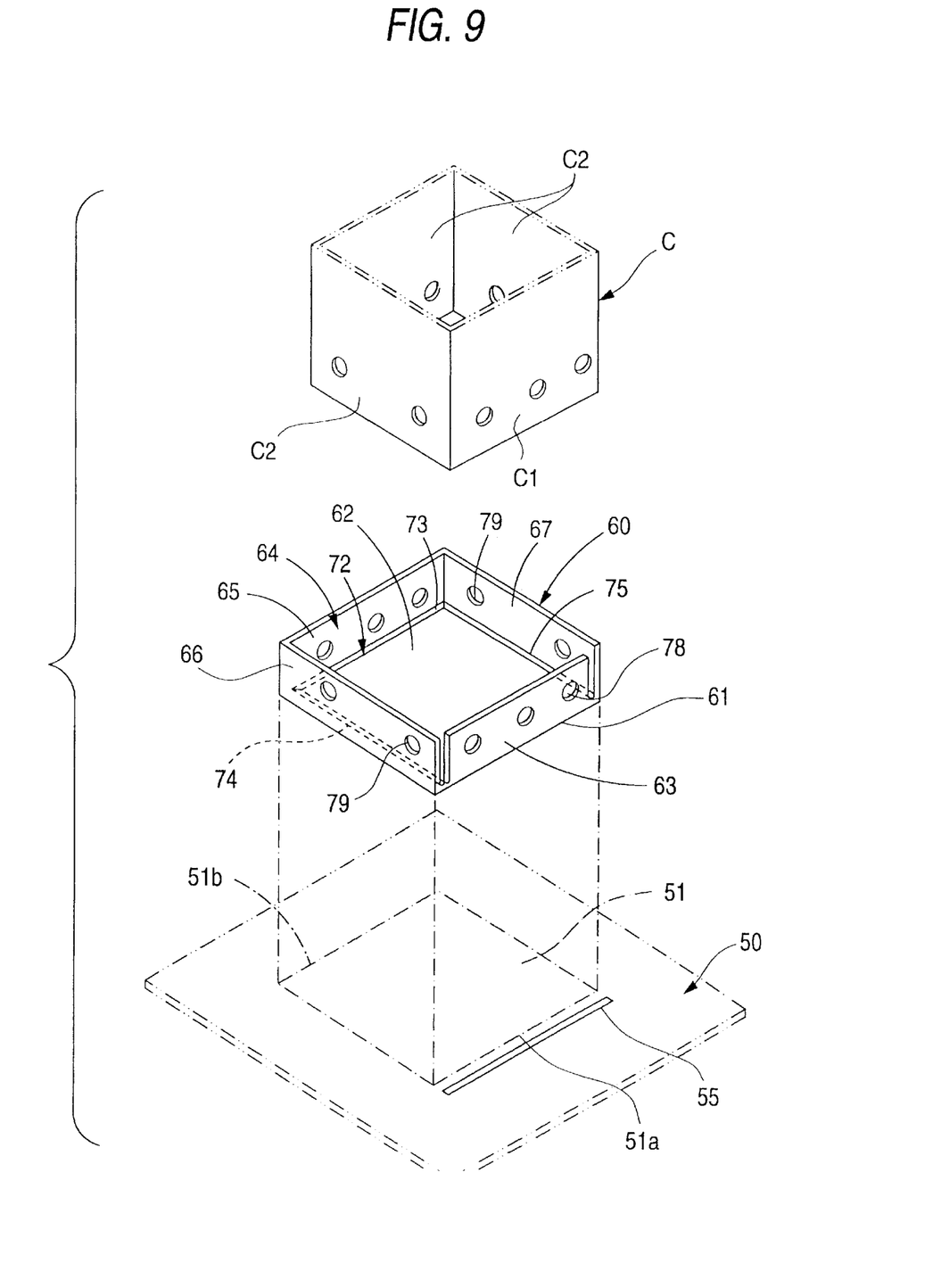
FIG. 9 is an exploded perspective view showing the structure of FIG. 7 viewed from the rear of the instrument panel.
Figure 10:
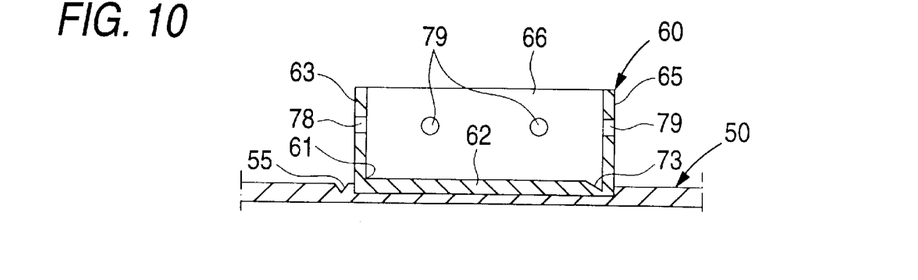
FIG. 10 is a longitudinal sectional view showing the rear of the instrument panel in the structure of the embodiment.

In the second embodiment for attaining the same object as in the first invention, as shown in FIGS. 7 to 9, the instrument panel 50 and the door reinforcement member 60 are characterized as follows in the air bag door structure integrally backed with the door reinforcement member 60 in the rear of the air bag door opening portion 51 of the instrument panel 50.

First, in an air bag door opening portion 51 of the instrument panel 50, a hinge side break portion 55 is provided at least in the door rotation axis side 51a. In the drawing, the reference numeral 51b designates the door release portion side; 52, a door portion; and the chain-line reference numeral 52A, the released door member.

On the other hand, the door reinforcement member 60 is designed so that its body portion 62 is united with the instrument panel 50. In the body portion 62, there are formed a hinge portion 61, a hinge side mount portion 63, an opening side break portion 72 (73, 74 and 75) and a reinforcement member mount portion 64 (projection pieces 65, 66 and 67).

The hinge portion 61 of the door reinforcement member 15 60 serves as a door rotation axis at the time of releasing the air bag door portion 52 as described above. As shown in the sectional view of FIG. 10, the hinge portion 61 is formed along the inside of the hinge side break portion 55 of the instrument panel 50. The hinge side mount portion 63 to the air bag container C is formed integrally with and extending out from the hinge portion 61. In the drawing, the reference numeral 78 designates mount holes through which mounting to the mount portion Cl of the air bag container C is performed by bolts, or the like, in the same manner as described above.

Figure 11:
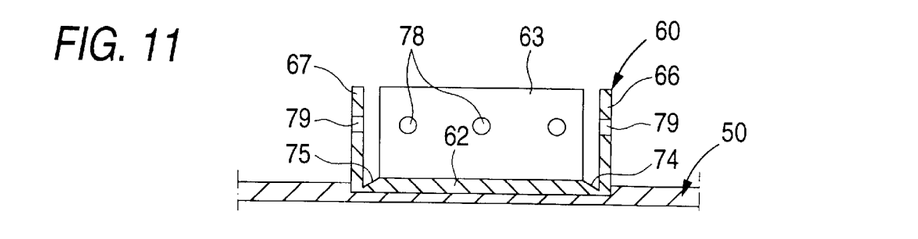
FIG. 11 is a longitudinal-sectional view showing the rear of the instrument panel in the case where the cutting direction is changed.

Further, it is to be understood from FIG. 9 that the release side break portion 72 (73, 74 and 75) of the door reinforcement member 60 is arranged along the door opening portion side Sib of the air bag door opening portion 51 of the instrument panel 50 as to be substantially U-shaped by three break portions (lines) 73, 74 and 75. Furthermore, as shown in FIG. 11, the reinforcement member mount portions 64 (65, 66 and 67) to the air bag container C are formed to correspond to the break portions (lines) 73, 74 and 75 respectively along the outside of the break portions (lines) 73, 74 and 75. Incidentally, as shown in the drawing, the release side break portion 72 (73, 74 and 75) of the door reinforcement member 60 is preferably located in the inside of the base portion of the reinforcement member mount portion 64 (65, 66 and 67) in order to ensure accurate breaking.

In the drawing, the reference numeral 79 designates mount holes through which mounting to the mount portion C2 of the air bag container C is performed by bolts B, or the like.

Figure 12A:
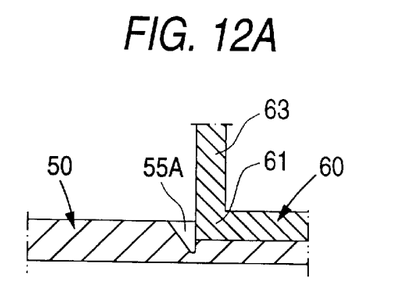
FIGS. 12A and 12B are partly enlarged sectional views showing an example of the hinge side break portion.
Figure 12B:
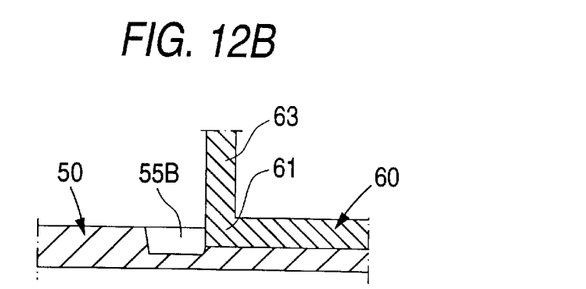

The relation between the instrument panel 50 and the door reinforcement member 60 will be described here in brief. As shown in FIGS. 12A and 12B, the hinge side break portion 55A, 55B of the instrument panel 50 is preferably provided so as to be located in the outside of the base portion of the hinge side mount portion 63 in which the hinge portion 61 of the door reinforcement member 60 is formed. Further, any shape and structure such as a V-groove, a U-groove wider than the V-groove, or the like, may be used for the hinge side break portion 55A, 55B so long as the hinge side break portion 55A, 55B is a thin portion which can be broken as shown in the drawings.

Figure 13:
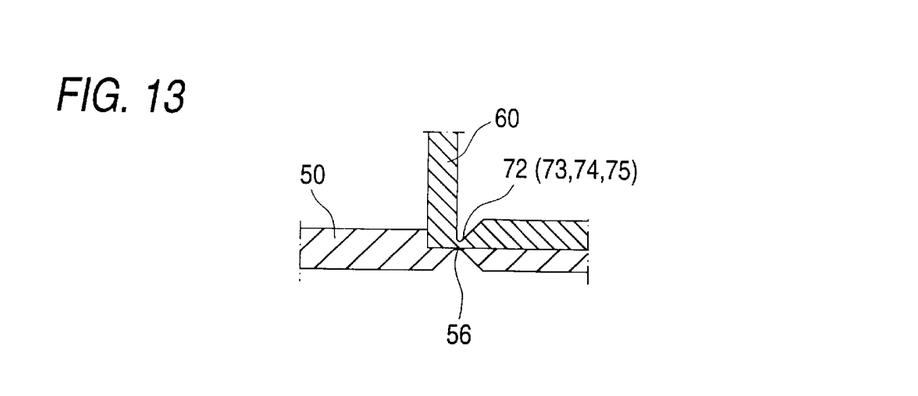
FIG. 13 is a partly enlarged sectional view showing an example of the opening side break portion.

Further, as shown in FIG. 13, a release side break portion 56 of the instrument panel, which is so thin that it can be broken, may be formed in the instrument panel 50. In this case, the release side break portion 56 of the instrument panel is formed corresponding to the release side break portion 72 (73, 74 and 75) of the door reinforcement member 60.

Figure 14:
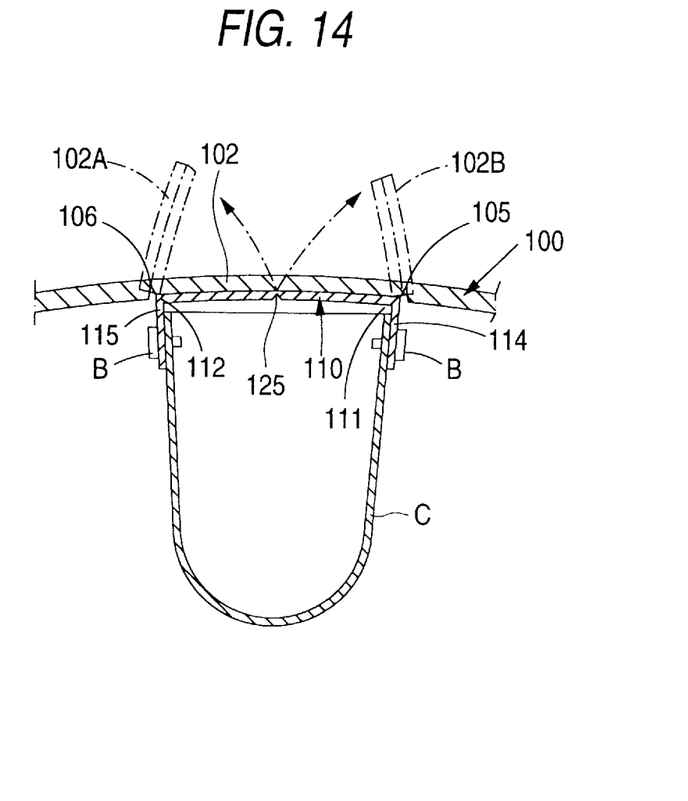
FIG. 14 is a cross-sectional view showing the air bag door portion in another embodiment.
Figure 15:
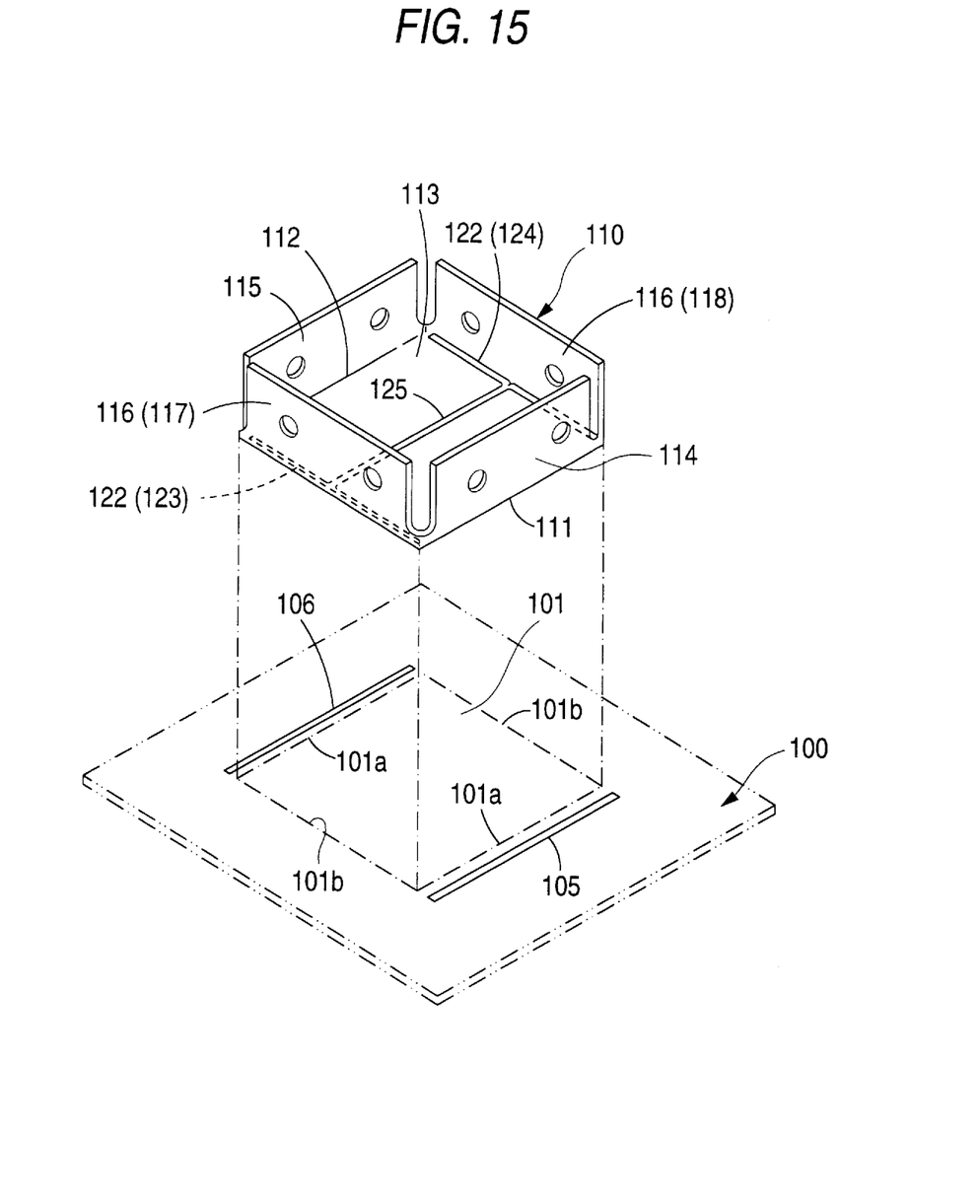
FIG. 15 is an exploded perspective view showing a main part, viewed from the rear of the instrument panel in the structure of the same embodiment.
Figure 16:
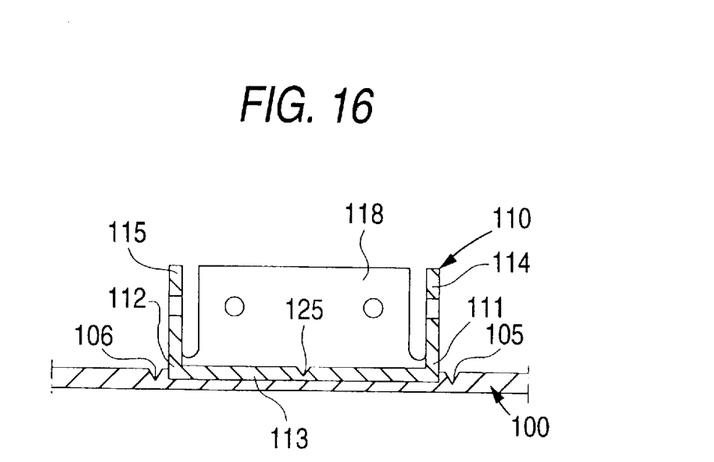
FIG. 16 is a longitudinal-sectional view showing the rear of the instrument panel in the structure of FIG. 14.

FIGS. 14 through 16 relate to the double hinge door structure of the air bag door portion 102 of the instrument panel 100. This door portion 102 is released on both sides of the center break portion 125 as represented by the chain lines 102A and 102B in FIG. 14.

In the double hinged door structure, as shown in FIG. 15, door rotation axis portion sides 101a, 101a of the air bag opening portion 101 of the instrument panel 100 are located on opposite sides. The reference numeral 101b designates door release portion sides. Accordingly, hinge side break portions 105 and 106 of the instrument panel 100 are formed in two places along the outside of the door rotation axis portion sides 101a, 110a which are arranged in the air bag opening portion 101 so as to be opposite to each other.

Similarly, there are formed two hinge portions 111 and 112 which are arranged in the door reinforcement member 110 so as to service as door rotation axes, and there are formed two hinge corresponding side mount portions 114 and 115.

Furthermore, release side break portions 122 (breaklines 123 and 124) and reinforcement member mount portions 116 (projection pieces 117 and 118) are formed adjacent sides of the hinge portions 111 and 112 and adjacent side mount portions 114 and 115, respectively. The reference numeral 125 designates a center break portion which is formed substantially in the center of the door body portion 113 extending to the release side break portions 122 (123 and 124). In this example, the break portion is H-shaped.

Incidentally, the structure in this embodiment is the same as described above.

Next, materials used for the instrument panel and the door reinforcement member will be described.

Generally, an air bag door portion having a double-layer structure of a resin constituting the instrument panel and a resin constituting the door reinforcement member is obtained by arranging a preliminary molded reinforcement member in a mold at the time of the molding of the instrument panel to integrate the reinforcement member with the instrument panel, also known as double injection molding, in which a reinforcement member and an instrument panel having an air bag door portion are injection-molded simultaneously.

In the case of the aforementioned structure, however, resin materials to be used for respective layers require the following physical properties.

First, there is required the strength of adhesion between the resin material constituting the instrument panel and the resin material constituting the reinforcement member. Second, to prevent adverse changes to the molding properties of the instrument panel in the case where the reinforcement member is used as an insert at the time of the molding of the instrument panel, the reinforcement member arranged in the mold must have a stiffness which is such that the reinforcement member is not deformed easily by shearing stresses of the molten resin which forms the general surface of the instrument panel. Third, the difference in the expansion characteristic against stress between the resin materials constituting the two layers must be small. This is to prevent one layer from deforming and causing pieces, or the like, to scatter when the air bag door portion is deformed by the expansion of the air bag, as would be the case where the difference in expansion between the resin materials of the two layers is large.

Further, in the resin material of the instrument panel, there is required expandability and stiffness sufficient to prevent the resin material from cracking, or the like, correspondingly to the deformation thereof at the time of the deployment of the air bag door portion, and there is also required high heat resistance sufficient to prevent the resin material from deforming, or the like, due to the temperature rise in the inside of the car. On the other hand, the resin material of the reinforcement member is required to withstand at low temperature shock which the resin material may endure.

At present, the main examples of the resin material used 10 for the instrument panel include: polypropylene type resin (PP in the Table), denatured polyphenylene oxide (PPO in the Table), glass fiber reinforced acrylonitrile-styrene copolymer (ASG in the Table), and so on. Examples of the resin material used for the door reinforcement member include: thermoplastic elastomer such as olefin type elastomer (TPO in the Table), styrene type elastomer (TPS in the Table), polyester type elastomer (TPEE in the Table), or the like; and polymer alloy of polyphenylene oxide and 6-Nylon (PA/PPO in the Table), and so on. The inventors of the present invention have discussed the properties of adhesion between these various types of resins having preferred physical properties for the instrument panel or for the air bag door. Results are shown in the following Table.

TABLE

| | | Instrument panel | | |
| --- | --- | --- | --- | --- |
| | | PP type | Denatured PPO | ASG |
| Door reinforcement members | TPO | ⊙ | x | x |
| | TPS | Δ | 0 | Δ |
| | TPEE | x | x | x |
| | PA/PPO | x | x | Δ |

It consequently has been determined that a combination of PP type resin and TPO type resin exhibits the best adhesion properties. These resin materials have been further discussed after provision of the instrument panel having the air bag door portion formed by using these resins. It has been further found that when these resins having predetermined physical properties are used in combination, the combination exhibits excellent physical properties such as excellent adhesion between the two layers, excellent molding property, a high stiffness and thermo-deformation temperature, and good shock strength at a low temperature.

That is, preferred examples of the combination of materials for the instrument panel and the door reinforcement member are as follows.

Instrument panel: A material formed from polypropylene type resin which exhibits a value of tensile elongation according to JIS-K7113 larger than 300%, a bending modulus of elasticity according to JIS-K7203 larger than 20000 kgf/cm$^2$, a thermo-deformation temperature according to JIS-K7207 higher than 120° C., and a value of Izod impact strength (23° C.) according to JIS-K7110 larger than 15 kg·cm/cm.

Door reinforcement member: A material formed from s olefin type elastomer which exhibits a bending modulus of elasticity according to JIS-K7203 larger than 3000 kgf/cm$^2$ and a value of Izod impact strength (−40° C.) according to JIS-K7110 larger than 20 kg·cm/cm.

In the structure combining the instrument panel 10 and the door reinforcement member, the air bag door portion is formed integrally with the general surface. Accordingly, not only the external appearance of the instrument panel is made very good but also the physical properties of the instrument panel and the door reinforcement member in the double-layer structure are made complementary to each other so that physical properties required for the instrument panel and the air bag door portion can be obtained, whereas with the conventional single layer structure it is difficult to satisfy all the physical properties required for the instrument panel and the air bag door portion.

Further, because the instrument panel is formed from polypropylene type resin and the door reinforcement member is formed from olefin type elastomer, the adhesion between the two members is very good and the molding accuracy and efficiency is very good.

Furthermore, because both the instrument panel and the door reinforcement member are formed from resin, they are light in weight making them easier to mount.

Further, by setting the value of tensile elongation 5 according to JIS-K7113 as one of the physical properties of polypropylene type resin constituting the instrument panel to be larger than 300%, the deformation of the instrument panel follows the deformation and opening of the air bag door reinforcement member preventing the instrument panel from breaking thereby protecting the passenger when the air bag door portion is deformed by the expansion of the air bag.

Further, by setting the value of Izod impact strength (23° C.) according to JIS-K7110 to be larger than 15 kg·cm/cm, the instrument panel can be prevented from cracking when the air bag door portion is deployed at ordinary temperatures.

Further, by setting the bending modulus of elasticity according to JIS-K7203 to be larger than 20000 kgf/cm$^2$, the instrument panel, has improved shape retaining characteristics.

Further, by setting the thermo-deformation temperature according to JIS-K7207 to be higher than 120° C., deformation is avoided even in the case where the instrument panel is heated to a high temperature by direct sunshine as when parking in summer, or the like.

Further, by setting the bending modulus of elasticity according to JIS-K7203 as one of the physical properties of olefin type elastomer constituting the door reinforcement member to be larger than 3000 kgf/cm$^2$, self shape retaining characteristic against shearing stress of molten resin at the time of the molding of the instrument panel can be given to the door reinforcement member. By setting the value of Izod impact strength (−40° C.) according to JIS-K7110 to be larger than 20 kg·cm/cm, the mount portion to the air bag container can be prevented from breaking when the air bag is developed at a low temperature.

Incidentally, the polypropylene type resin used for the instrument panel is not limited specifically so long as the aforementioned physical properties can be satisfied. The polypropylene type resin may be blended with a suitable amount of other thermoplastic resins, fillers, or the like.

Further, as with the olefin type elastomer used for the door reinforcement member, there may be used a blend of polypropylene and ethylene-propylene copolymer rubber or a dynamically vulcanized blend thereof, or the like.

Further, additives can be added suitably to the polypropylene type resin and the olefin type elastomer so long as the desired physical properties are not lost. Examples of additives include antioxidants, ultraviolet absorbers, fluidity improving agents, reinforcement materials such as talc, fiber, or the like, and so on.

As described above with reference to the drawings, in accordance with this invention, in an air bag door structure integrally backed with a door reinforcement member in the rear of an air bag door opening portion of an instrument panel, a hinge side break portion is provided on the door rotation axis side of the instrument panel, a hinge side mount portion for mounting an air bag container is formed on a hinge portion of the door reinforcement member, and an instrument panel mount portion for mounting the air bag container is integrally formed along the outside of the opening side break portion of the instrument panel (first embodiment) or door reinforcement member (second embodiment). Accordingly, the area near the door opening portion of the instrument panel is reinforced by the mount portion to the air bag container so that the stress forces from the expansion of the air bag is concentrated at the break portion. Accordingly, opening of the door portion is made securely and very smoothly. Also, the cleavage of the air bag door portion is prevented from acting on portions other than the break portions.

Furthermore, because the break portion for partitioning the air bag door portion is provided integrally with the instrument panel, the external appearance of the product is made good.

The foregoing description of a preferred embodiment of the invention has been presented for purposes of illustration and description. It is not intended to be exhaustive or to limit the invention to the precise form disclosed, and S modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An air bag door structure for mounting an air bag container containing an air bag, said air bag door structure integrally backed with a door reinforcement member on a rear side of an air bag door opening portion of an instrument panel, said air bag door structure comprising:

a hinge side break portion, having an inside edge and an outside edge, disposed on a door rotation axis side in the air bag door opening portion of said instrument panel, wherein said hinge side break portion breaks upon a deployment of the air bag from the air bag container;

an opening side break portion, having an inside edge and an outside edge, disposed on a door opening portion side in said air bag door opening portion of said instrument panel;

an instrument panel mount portion having the air bag container mounted thereto, said instrument panel mount portion being unitedly formed adjacent the outside edge of said opening side break portion so as to concentrate stress forces resulting from the deployment of the air bag along said opening side break portion; and a body portion of said door reinforcement member being integrated with said instrument panel;

a hinge portion serving as a door rotation axis, being formed in said body portion on an inside edge side of said hinge side break portion of said instrument panel; and a hinge side mount portion having the air bag container mounted thereto, said hinge side mount portion extending from said body portion on an inside edge side of said hinge side break portion of said instrument panel so as to concentrate stress forces resulting from the deployment of the air bag along said hinge side break portion.

2. An air bag door structure according to claim 1, wherein said instrument panel mount portion has a base portion where said instrument panel mount portion is unitedly formed near the outside edge of said opening side break portion, said base portion having an inside facing said air bag door opening portion; and wherein said opening side break portion of said instrument panel is located on the inside of the base portion of said instrument panel mount portion.

3. An air bag door structure according to claim 1, wherein said instrument panel mount portion is formed so as to be longer than said opening side break portion.

4. An air bag door structure according to claim 1, wherein said instrument panel and said door reinforcement member are formed by the following combination:

instrument panel: polypropylene resin which exhibits a value of tensile elongation according to JIS-K7113 larger than 300%, a bending modulus of elasticity according to JIS-K7203 larger than 20000 kgf/cm$^2$, a thermo-deformation temperature according to JIS-K7207 higher than 120° C., and a value of Izod impact strength (23° C.) according to JIS-K7110 larger than 15 kg·cm/cm; and door reinforcement member: olefin elastomer which exhibits a bending modulus of elasticity according to JIS-K7203 larger than 3000 kgf/cm$^2$ and a value of Izod impact strength (40° C.) according to JIS-K7110 larger than 20 kg·cm/cm.

5. An air bag door structure according to claim 1, wherein said body portion of said door reinforcement member being integrated with said instrument panel extends substantially to the inside edge of said opening side break portion and said hinge side break portion.

6. An air bag door structure according to claim 1, wherein said door reinforcement member and said instrument panel are integrally molded.

7. An air bag door structure for mounting an air bag container containing an air bag, said air bag door structure integrally backed with a door reinforcement member on a rear side of an air bag door opening portion of an instrument panel, said air bag door structure comprising:

a hinge side break portion, having an inside edge and an outside edge, disposed at least on a door rotation axis side in the air bag door opening portion of said instrument panel, wherein said hinge side break portion breaks upon a deployment of the air bag from the air bag container;

a body portion of said door reinforcement member being integrated with said instrument panel;

a hinge portion serving as a door rotation axis, being formed in said body portion on an inside edge side of said hinge side break portion of said instrument panel;

a hinge side mount portion having the air bag container mounted thereto, said hinge side mount portion extending from said body portion on an inside edge side of said hinge side break portion of said instrument panel so as to concentrate stress forces resulting from the deployment of the air bag along said hinge side break portion;

an opening side break portion, having an inside edge and an outside edge, being formed on a door opening portion side of said air bag door opening portion; and a reinforcement member mount portion having the air bag container mounted thereto, said reinforcement mount portion being formed adjacent the outside edge of said opening side break portion on the door opening portion side of said air bag door opening portion so as to concentrate stress forces resulting from the deployment of the air bag along said opening side break portion.

8. An air bag door structure according to claim 7 wherein said reinforcement member mount portion has a base portion where said reinforcement member mount portion is formed along the outside edge of said opening side break portion, said base portion having an inside facing said air bag door opening portion;

wherein said reinforcement member further has an opening side break portion; and wherein said opening side break portion of said door reinforcement member is located on the inside of the base portion of said reinforcement member mount portion.

9. An air bag door structure according to claim 4, wherein said hinge side mount portion for attachment to an air bag container has a base portion attached to said body portion, said base portion of said hinge side mount having an outside facing away from said door opening portion; and wherein said hinge side break portion of said instrument panel is located adjacent the outside of said base portion of said hinge side mount portion of said reinforcement member.

10. An air bag door structure according to claim 7, wherein said instrument panel and said door reinforcement member are formed by the following combination:

instrument panel: polypropylene resin which exhibits a value of tensile elongation according to JIS-K7113 larger than 300%, a bending modulus of elasticity according to JIS-K7203 larger than 20000 kgf/cm$^2$, a thermo-deformation temperature according to JIS-K7207 higher than 120° C., and a value of Izod impact strength (23° C.) according to JIS-K7110 larger than 15 kg·cm/cm; and door reinforcement member: olefin elastomer which exhibits a bending modulus of elasticity according to JIS-K7203 larger than 3000 kgf/cm$^2$ and a value of Izod impact strength (−40° C.) according to JIS-K7110 larger than 20 kg·cm/cm.

11. An air bag door structure according to claim 7, wherein said body portion of said door reinforcement member being integrated with said instrument panel extends substantially to the inside edge of said opening side break portion and said hinge side break portion.

12. An air bag door structure according to claim 7, wherein said door reinforcement member and said instrument panel are integrally molded.

13. An air bag door structure integrally backed with a door reinforcement member on a rear side of an air bag door opening portion of an instrument panel, said air bag door structure comprising:

- a hinge side break portion, having an inside edge and an outside edge, disposed on a door rotation axis side in the air bag door opening portion of said instrument panel;
- an opening side break portion, having an inside edge and an outside edge, disposed on a door opening portion side in said air bag door opening portion of said instrument panel;
- an instrument panel mount portion for an air bag container being unitedly formed adjacent the outside edge of said opening side break portion; and
- a body portion of said door reinforcement member being integrated with said instrument panel;
- a hinge portion serving as a door rotation axis, being formed in said body portion on an inside edge side of said hinge side break portion of said instrument panel; and
- a hinge side mount portion for attachment to said air bag container, extending from said body portion on an inside edge side of said hinge side break portion of said instrument panel; and
- wherein said body portion of said door reinforcement member being integrated with said instrument panel extends substantially to the inside edge of said opening side break portion and said hinge side break portion.

* * * * *